US009823001B2

(12) United States Patent
Lundberg et al.

(10) Patent No.: US 9,823,001 B2
(45) Date of Patent: Nov. 21, 2017

(54) METHOD AND SYSTEM FOR MEASURING VOLUME OF FLUID DRAINED FROM AN AIR CONDITIONING SERVICE UNIT

(71) Applicants: Bosch Automotive Service Solutions Inc., Warren, MI (US); Robert Bosch GmbH, Stuttgart (DE)

(72) Inventors: Dylan M. Lundberg, Lonsdale, MN (US); Mark W. McMasters, Owatonna, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 174 days.

(21) Appl. No.: 14/964,822

(22) Filed: Dec. 10, 2015

(65) Prior Publication Data
US 2016/0169569 A1   Jun. 16, 2016

Related U.S. Application Data

(60) Provisional application No. 62/091,594, filed on Dec. 14, 2014.

(51) Int. Cl.
*F25B 45/00* (2006.01)
*G01F 1/34* (2006.01)
*G01F 1/00* (2006.01)

(52) U.S. Cl.
CPC ............... *F25B 45/00* (2013.01); *G01F 1/34* (2013.01); *F25B 2345/002* (2013.01); *G01F 1/007* (2013.01)

(58) Field of Classification Search
CPC ............... F25B 45/00; F25B 2345/002; F25B 2345/003; F25B 2345/006; F25B 2345/007; G01F 1/007; G01F 1/34
(Continued)

(56) References Cited

U.S. PATENT DOCUMENTS

| 5,050,438 A * | 9/1991 | Ezell, Jr. | G01F 1/007 73/196 |
| 7,000,467 B2 * | 2/2006 | Chu | G01F 1/007 73/299 |

(Continued)

FOREIGN PATENT DOCUMENTS

WO   2015/164725   10/2015

*Primary Examiner* — Marc Norman
(74) *Attorney, Agent, or Firm* — Maginot, Moore & Beck LLP

(57) ABSTRACT

An air conditioning service system includes an accumulator defining an accumulator chamber, a pressure transducer operably connected to the accumulator chamber, a drain valve operably connected to the accumulator chamber, and a controller operably connected to the pressure transducer and the drain valve. The controller includes a processor configured to execute program instructions stored in a memory to determine a volume of liquid drained from the accumulator by: determining a volumetric flow rate of liquid through the drain valve by controlling the drain valve with the controller to an open position for a predetermined period of time; detecting an increased rate of pressure reduction while the drain valve is open; and determining an amount of liquid drained through the drain valve based upon the volumetric flow rate and a total time elapsed between opening the drain valve and the increased rate of pressure reduction.

20 Claims, 7 Drawing Sheets

(58) Field of Classification Search
USPC .......................................................... 62/149
See application file for complete search history.

(56) References Cited

U.S. PATENT DOCUMENTS

| | | | |
|---|---|---|---|
| 2007/0079892 A1* | 4/2007 | Cohen | F17C 5/007 |
| | | | 141/105 |
| 2011/0066293 A1* | 3/2011 | Haggerty | G01F 1/007 |
| | | | 700/282 |
| 2017/0003150 A1* | 1/2017 | Noboa | G01F 1/34 |

* cited by examiner

METHOD AND SYSTEM FOR MEASURING VOLUME OF FLUID DRAINED FROM AN AIR CONDITIONING SERVICE UNIT

CROSS-REFERENCE TO RELATED APPLICATION

This application claims priority to U.S. Provisional Application Ser. No. 62/091,594 entitled "Method and System for Measuring Volume of Fluid Drained from an Air Conditioning Service Unit," filed Dec. 14, 2014, the disclosure of which is hereby incorporated herein by reference in its entirety.

TECHNICAL FIELD

This disclosure relates generally to refrigeration systems, and more particularly to refrigerant recovery systems for refrigeration systems.

BACKGROUND

Air conditioning systems are currently commonplace in homes, office buildings and a variety of vehicles including, for example, automobiles. Air conditioning systems include a mechanical compressor that requires oil to properly function. During normal operation of the air conditioning system, a portion of the oil is entrained in the refrigerant and circulated through the air conditioning system. As such, in order to maintain the overall efficiency and efficacy of an air conditioning system, the refrigerant included therein may be periodically replaced or recharged.

Portable carts, also known as recover, recycle, recharge ("RRR") refrigerant service carts or air conditioning service ("ACS") units, are used in connection with servicing refrigeration circuits of air conditioning systems. The portable machines include hoses coupled to the refrigeration circuit to be serviced. During servicing of the air conditioning system, the oil entrained refrigerant from the air conditioning system is drained into an ACS unit, where the oil is separated from the refrigerant during a recycling/purification process. The old, separated oil is then drained from the ACS unit through a solenoid valve into a bottle so that an ACS unit technician knows how much oil needs to be injected back into the air conditioning system by the ACS unit. Providing the same amount of new oil back into the air conditioning system is important to ensure proper and efficient operation of the air conditioning system.

Previously, several methods have been used to measure the amount of oil drained from the ACS unit during a recovery process. A first commonly used method involves visual identification. The oil bottle of the ACS unit typically includes graduated markings to indicate the amount of oil in the bottle. The old oil is drained from the ACS unit into the oil bottle, and the user determines the amount of oil drained by visually inspecting the oil level in the bottle with reference to the graduated markings on the bottle. This method is generally low-cost, but relies on the user to correctly determine the amount of oil drained into the bottle, which is subject to user error.

Another conventional method uses a load cell to measure the weight of the oil bottle after the oil has been drained into the bottle. The system is configured with a controller to determine the weight of the oil drained by subtracting the weight of the bottle when empty from the weight of the bottle with the old oil. While this method is more accurate than reading markings on a bottle, load cells are expensive and delicate. As a result, ACS units having a load cell for the oil bottle are more costly to manufacture and maintain.

Furthermore, a load cell relies on the weight of the oil, rather than the volume. The density of oil significantly changes depending on oil temperature, and density is directly related to the conversion between weight and volume of the oil. Oil drained from the air conditioning system may be at a different temperature than the oil that is added to the air conditioning system by the ACS unit, which is typically at ambient temperature. Thus, if the ACS unit injects replacement oil having a weight corresponding to the weight of the oil removed, but the temperature of the replacement oil and the removed oil are different, a different volume of oil will be added to the air conditioning system than was removed.

It would therefore be desirable to provide an ACS unit having low cost and improved measurement accuracy of the volume of oil drained from an air conditioning system.

SUMMARY

In a first embodiment, an air conditioning service system according to the disclosure includes an accumulator defining an accumulator chamber, a pressure transducer operably connected to the accumulator chamber, a drain valve operably connected to the accumulator chamber, and a controller operably connected to the pressure transducer and the drain valve. The controller includes a processor configured to execute program instructions stored in a memory to determine a volume of liquid drained from the accumulator by: determining a volumetric flow rate of liquid through the drain valve by controlling the drain valve with the controller to an open position for a predetermined period of time; detecting an increased rate of pressure reduction while the drain valve is controlled to the open position; and determining an amount of liquid drained through the drain valve based upon the determined volumetric flow rate and a total time elapsed between controlling the drain valve to the open position and the detected increased rate of pressure reduction.

In one embodiment, the controller is configured to execute the program instructions to determine the volumetric flow rate by obtaining a first signal from the pressure transducer associated with a first pressure within the accumulator chamber prior to controlling the drain valve to the open position and obtaining a second signal from the pressure transducer associated with a second pressure within the accumulator chamber after the predetermined period of time has elapsed.

In some embodiments of the air conditioning service system, the controller is configured to execute the program instructions to determine the volumetric flow rate based upon the following equation:

$$V_{2,vap} = \frac{P_{1,vap} V_{1,vap}}{P_{2,vap}},$$

wherein $P_{1,vap}$ is the first pressure, $V_{1,vap}$ is a first volume of vapor in the accumulator chamber before the drain valve is controlled to an open position, $P_{2,vap}$ is the second pressure, and $V_{2,vap}$ is a second volume of the vapor in the accumulator chamber associated with the second pressure.

In a further embodiment according to the disclosure, the controller is configured to execute the program instructions to determine the volumetric flow rate based upon the following equation:

$$Q_{liq} = \frac{V_{2,vap} - V_{1,vap}}{t_2},$$

wherein $t_2$ is the predetermined period of time and $Q_{liq}$ is the volumetric flow rate.

In another embodiment of the air conditioning service system, the controller is configured to execute the program instructions to determine the amount of liquid drained through the drain valve based upon the following equation:

$$V_{1,liq} = Q_{liq} t_T$$

wherein $v_{1,liq}$ is the amount of liquid drained through the drain valve and $t_T$ is the total time elapsed between controlling the drain valve to the open position and the detected increased rate of pressure reduction.

In one embodiment of the air conditioning service system, the controller is configured to execute the program instructions to control the drain valve to a closed position after the detected increased rate of pressure reduction.

In another embodiment according to the disclosure, the predetermined period of time is less than or equal to the total time elapsed between controlling the drain valve to the open position and the detected increased rate of pressure reduction.

In further embodiments, the air conditioning service system further comprises a first valve operably connected to the accumulator chamber and a source of pressure. The controller is operably connected to the first valve and is configured to execute the program instructions to control, before determining the volumetric flow rate, the first valve to a first valve open position for a second predetermined time and control the first valve to a first valve closed position after the second predetermined time has elapsed.

In yet another embodiment, the source of pressure includes an oil separator filled with compressed refrigerant vapor.

In one particular embodiment, the vapor in the accumulator chamber includes a refrigerant and the liquid drained from the accumulator includes an oil.

In another embodiment according to the disclosure, a method of determining a volume of liquid drained from an accumulator chamber defined in an accumulator comprises: determining, with a controller, a volumetric flow rate of liquid through a drain valve operably connected to the accumulator chamber by controlling the drain valve to an open position for a predetermined period of time; detecting, with the controller, an increased rate of pressure reduction while the drain valve is controlled to the open position using a pressure transducer operably connected to the accumulator chamber; and determining, with the controller, an amount of liquid drained through the drain valve based upon the determined volumetric flow rate and a total time elapsed between controlling the drain valve to the open position and the detected increased rate of pressure reduction.

In some embodiments of the method, the determining of the volumetric flow rate further comprises obtaining a first signal from the pressure transducer associated with a first pressure within the accumulator chamber prior to controlling the drain valve to the open position and obtaining a second signal from the pressure transducer associated with a second pressure within the accumulator chamber after the predetermined period of time has elapsed.

In further embodiments of the method according to the disclosure, the determining of the volumetric flow rate is based upon the following equation:

$$V_{2,vap} = \frac{P_{1,vap} V_{1,vap}}{P_{2,vap}},$$

wherein $P_{1,vap}$ is the first pressure, $V_{1,vap}$ is a first volume of vapor in the accumulator chamber before the drain valve is controlled to an open position, $P_{2,vap}$ is the second pressure, and $V_{2,vap}$ is a second volume of the vapor in the accumulator chamber associated with the second pressure.

In one particular embodiment, the determining of the volumetric flow rate is based upon the following equation:

$$Q_{liq} = \frac{V_{2,vap} - V_{1,vap}}{t_2},$$

wherein $t_2$ is the predetermined period of time, and $Q_{liq}$ is the volumetric flow rate.

In yet another embodiment of the method, the determining of the amount of liquid drained through the drain valve is based upon the following equation:

$$V_{1,liq} = Q_{liq} t_T$$

wherein $v_{1,liq}$ is the amount of liquid drained through the drain valve, and $t_T$ is the total time elapsed between controlling the drain valve to the open position and the detected increased rate of pressure reduction.

In some embodiments, the method further comprises controlling the drain valve, with the controller, to a closed position after the detected increased rate of pressure reduction.

In a further embodiment of the method, the predetermined period of time is less than or equal to the total time elapsed between controlling the drain valve to the open position and the detected increased rate of pressure reduction.

In yet another embodiment, the method further comprises, before the determining of the volumetric flow rate, controlling a first valve operably connected to the accumulator chamber and a source of pressure to a first valve open position for a second predetermined time and controlling the first valve to a first valve closed position after the second predetermined time has elapsed.

In another embodiment of the method, the source of pressure includes an oil separator having compressed vapor refrigerant.

In one embodiment of the method, the vapor in the accumulator chamber includes refrigerant and the liquid drained from the accumulator includes oil.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
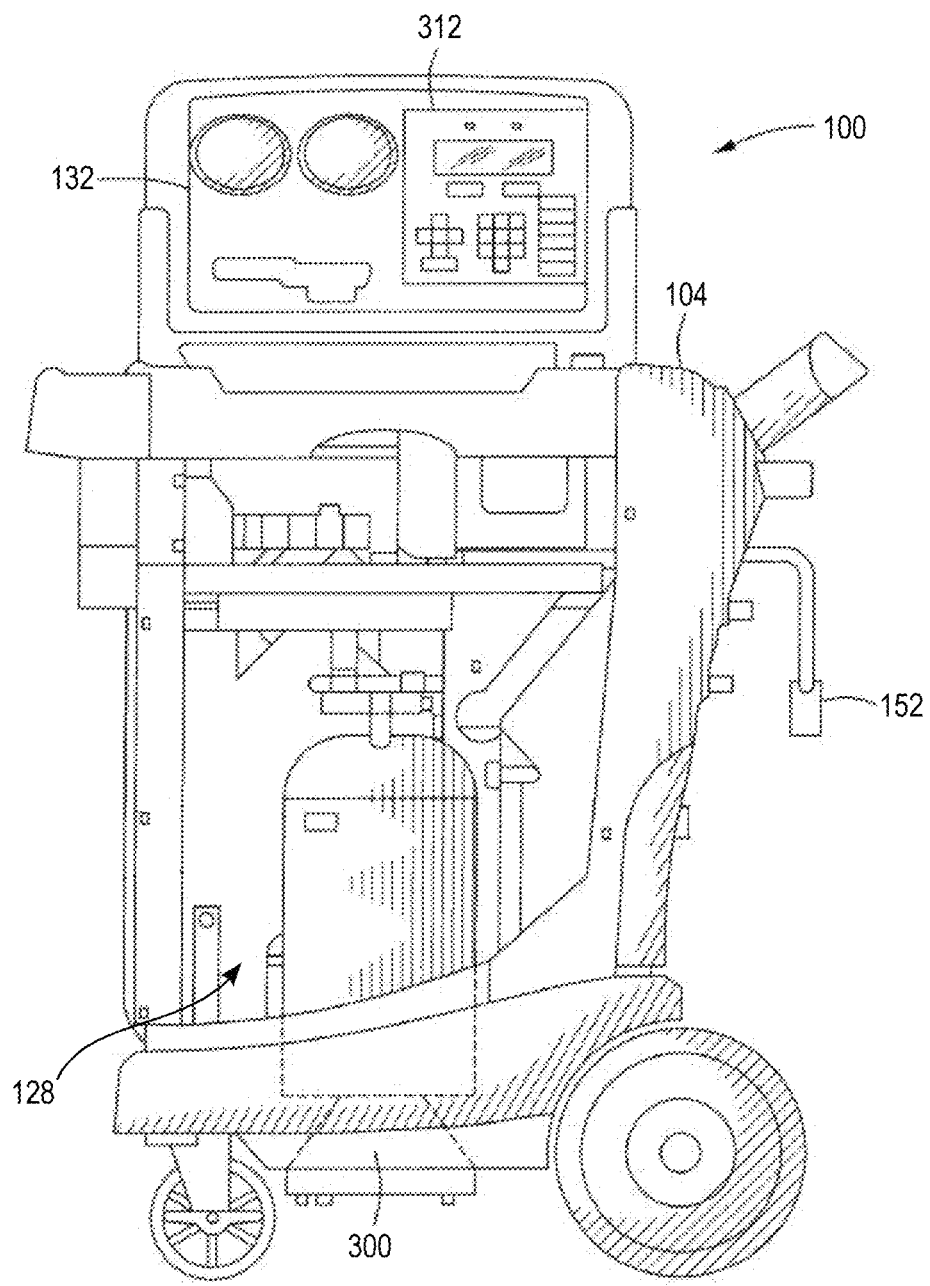
FIG. 1 is a partial cutaway front view of a refrigerant service system according to the disclosure.
Figure 2:
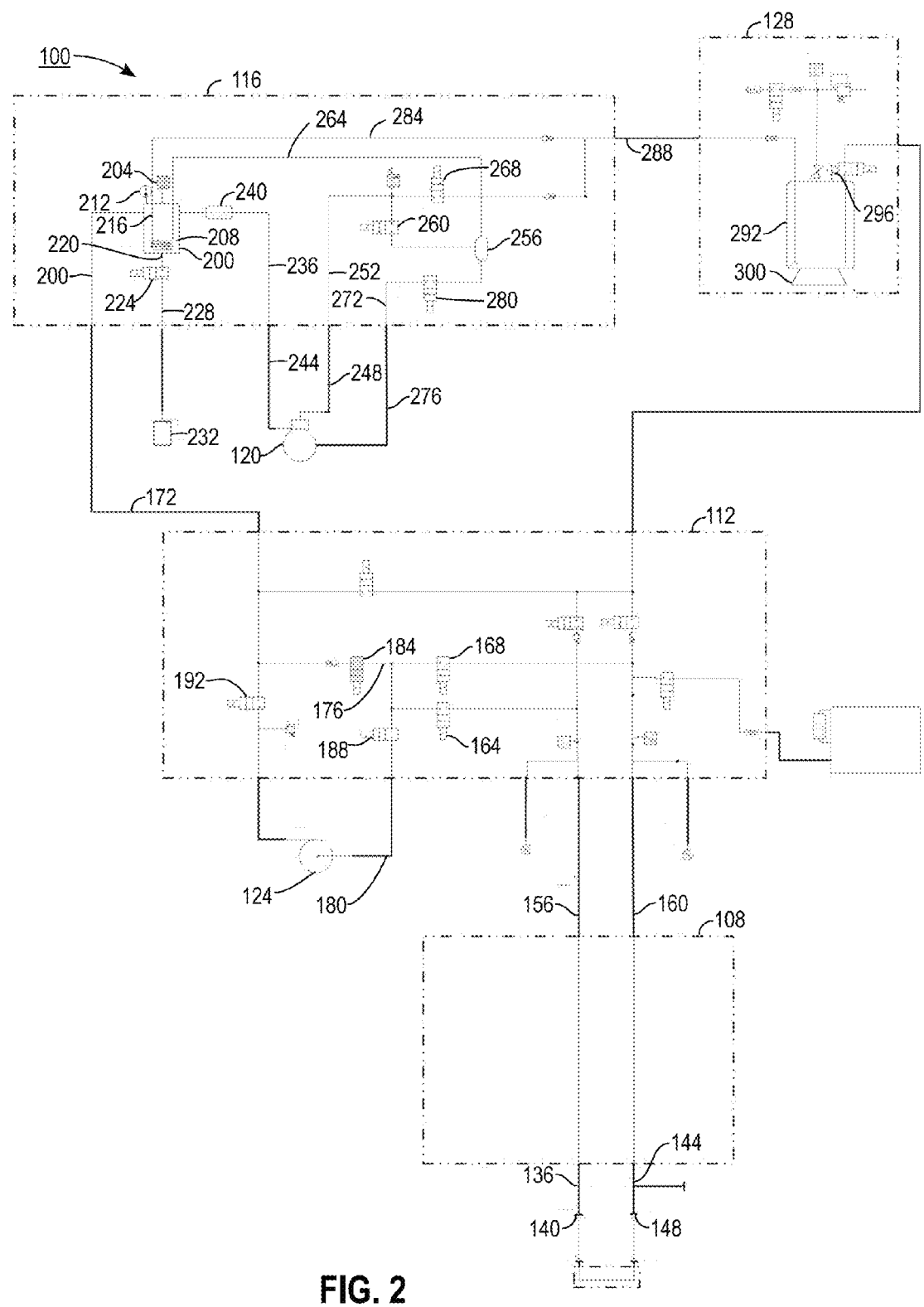
FIG. 2 is a schematic view of the refrigerant service system of FIG. 1.

FIG. 1 is an illustration of an air conditioning service ("ACS") system 100, while FIG. 2 schematically depicts the components of the ACS system. The ACS system 100 includes a housing 104, in which a bulkhead manifold 108 (FIG. 2), a first manifold 112 (FIG. 2), a second manifold 116 (FIG. 2), a compressor 120 (FIG. 2), a vacuum pump 124 (FIG. 2), an ISV assembly 128, and a control unit 132 (FIG. 1) are arranged.

With reference to FIG. 2, the bulkhead manifold 108 has a high-side service hose 136 with a high-side coupler 140 and a low-side service hose 144 with a low-side coupler 148. The high-side and low-side service hoses 136, 144, respectively, are configured to attach to high-side and low-side service ports of an air conditioning system, and each of the service hoses 136, 144 is connected to a respective hose connection 152 (only one is visible in FIG. 1). The bulkhead manifold 108 routes the high-side service hose 136 to a high-side bulkhead hose 156 and the low-side service hose 144 to a low-side bulkhead hose 160. The high-side and low-side bulkhead hoses 156, 160 each connect the bulkhead manifold 108 to the first manifold 112.

The first manifold 112 includes a high-side inlet valve 164, which is connected to the high-side bulkhead hose 156, and a low-side inlet valve 168, which is connected to the low-side bulkhead hose 160. The inlet valves 164, 168 connect to a manifold connection tube 172 via a recovery line 176 and via a vacuum line 180. A recovery valve 184 is configured to control fluid flow through in the recovery line 176, while first and second vacuum solenoid valves 188, 192 are configured to control fluid flow through the vacuum line 180. The vacuum pump 124 is arranged in the vacuum line 180. The manifold connection tube 172 fluidly couples the first manifold 112 to the second manifold 116.

The second manifold 116 includes a refrigerant input conduit 196 that fluidly connects the recovery input line 172 to an accumulator 200. The accumulator 200 includes an accumulator pressure sensor 204 configured to sense the pressure in an accumulator chamber 208 in the accumulator 200. In some embodiments, the accumulator further includes an accumulator temperature sensor 212 configured to sense the temperature in the accumulator chamber 208. The accumulator 200 also includes a heat exchanger 216 located in the accumulator chamber 208.

The accumulator 200 also includes an oil drain outlet 220, which is connected to an oil drain solenoid valve 224. The oil drain solenoid valve 224 controls a fluid connection from the accumulator 200 to an oil drain line 228, which drains oil into an oil receptacle 232.

A compressor suction conduit 236 carries refrigerant from the accumulator chamber 208 to a filter and dryer unit 240 and to a compressor suction hose 244, which leads to the suction side of the compressor 120. A compressor discharge tube 248 carries refrigerant from the high pressure side of the compressor 120 to a compressor discharge conduit 252 in the second manifold 116. The compressor discharge conduit 252 is fluidly connected to a compressor oil separator 256 via a compressor oil separator input solenoid valve 260, and is also fluidly connected to a vapor refrigerant return conduit 264 via a compressor discharge solenoid valve 268.

The compressor oil separator 256 is fluidly coupled to the compressor 120 by an oil return conduit 272 and a compressor oil return hose 276. A compressor oil return solenoid valve 280 is configured to control flow through the oil return conduit 272 to selectively drain the oil from the compressor oil separator 256 to the compressor 120. Vapor refrigerant from the compressor oil separator 256 is carried through the vapor refrigerant return conduit 264 to the heat exchanger 220. The refrigerant discharge conduit 284 fluidly connects the compressor heat exchanger 216 (and the compressor discharge conduit 272 via the separator input solenoid valve 280) to a refrigerant discharge hose 288.

The refrigerant discharge hose 288 delivers the refrigerant vapor from the second manifold 116 to the ISV assembly 128, which includes an ISV tank 292. The refrigerant recovered from the second manifold 116 is stored in the ISV tank 292 for subsequent reuse or disposal. In some embodiments, the ISV assembly 128 includes one or both of an ISV temperature sensor 296 configured to sense the temperature in the ISV tank 292 or the temperature immediately around the ISV tank 292, and an ISV scale 300 configured to sense the weight of the ISV tank 292.

The ISV tank 292 is configured to store refrigerant for the ACS unit 100. No limitations are placed on the kind of refrigerant that may be used in the ACS system 100. As such, the ISV tank 292 is configured to accommodate any refrigerant that is desired to be collected. In some embodiments, the ISV tank 292 is particularly configured to accommodate refrigerants that are commonly used in the A/C systems of vehicles (e.g., cars, trucks, boats, planes, etc.), for example R-134a, $CO_2$, or R1234yf. In some embodiments, the ISV assembly 128 includes multiple ISV tanks configured to store different refrigerants.

Figure 3:
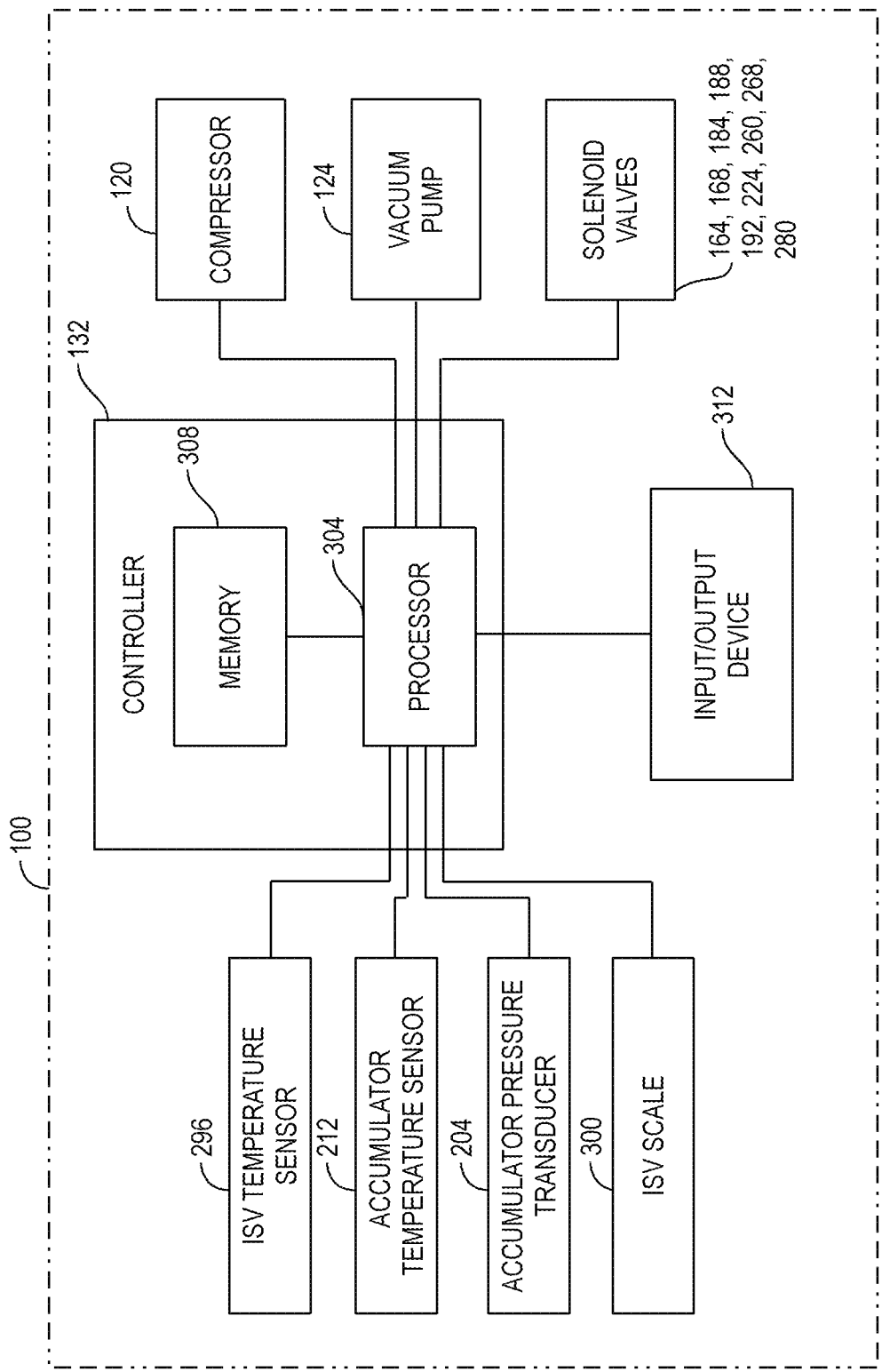
FIG. 3 is a schematic view of the control components of the refrigerant service system of FIG. 3.

FIG. 3 is a schematic diagram of the control unit 132 (also referred to herein as the controller) and the components communicating with the control unit 132 in the ACS system 100. Operation and control of the various components and functions of the ACS system 100 are performed with the aid of the controller 132. The control unit 132 is implemented with a general or specialized programmable processor 304 that executes programmed instructions. In some embodiments, the controller includes more than one general or specialized programmable processor. The instructions and data required to perform the programmed functions are stored in a memory unit 308 associated with the control unit 132. The processor 304, memory 308, and interface circuitry configure the controller 20 to perform the functions described above and the processes described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

The ISV temperature sensor 296 and accumulator temperature sensor 212 are configured to transmit electronic signals representing the respective sensed temperatures to the controller 132. The accumulator pressure transducer 204 transmits electronic signals representing the sensed pressure in the accumulator 200 to the controller 132, and the ISV scale 300 transmits electronic signals representing the sensed mass of the ISV tank 292 to the controller 20. The controller 132 includes a timer (not shown) configured to determine the time at which each pressure or temperature signal is received.

The controller 132 is electrically connected to and configured to receive the temperature signal from the ISV temperature sensors 212, 296, receive the pressure signal from the pressure transducer 204, and receive the ISV mass signal from the ISV scale 300. The signals from the sensors and transducers are transmitted when requested by the controller 132 or are sent continuously or on a predetermined basis, such as every second, 5 seconds, 10 seconds, 30 seconds, minute, 5 minutes, 15 minutes, 30 minutes, hour, etc.

The signals indicating pressure, temperature and time received by the controller 132 are stored in the memory 308 of the controller 132. The processor 304 transmits signals to operate the various solenoid valves 164, 168, 184, 188, 192, 224, 260, 268, 280 based on the sensor signals and control algorithms stored in the memory 308 of the controller 132. The controller 132 is also operably connected to an input/output device 312 located on the outside of the housing 104 to enable a user to input parameters and activate operating algorithms for the controller 132, and to enable the controller 132 to display information to the user of the ACS unit 100.

With particular reference to FIG. 2, in operation of the ACS unit 100, the high-side and low-side couplers 140, 148 are connected to the high-side and low-side connection ports of an air conditioning system (not shown). The high-side and low-side solenoids 164, 168 and the recovery solenoid 184 are opened to perform a recovery operation, enabling compressed refrigerant within the air conditioning system to flow to the second manifold 116. The refrigerant enters the accumulator 200 via the refrigerant input conduit 196, where heat from compressed and heated refrigerant in the heat exchanger 216 vaporizes the refrigerant. A small amount of system oil is typically entrained in the refrigerant during normal use in the air conditioning system. The system oil has a higher boiling point than the refrigerant, and therefore remains in a liquid phase and falls to the bottom of the accumulator chamber 208 under the force of gravity as the refrigerant is vaporized.

The controller 132 controls the compressor oil separator input solenoid valve 260 and activates the compressor 120 to generate a negative pressure in the compressor suction hose 244 and compressor suction conduit 236 to pull the vaporized refrigerant in the accumulator chamber 208 out via the filter and dryer unit 240. The filter and dryer unit 240 removes moisture and other contaminants present in the refrigerant. The refrigerant continues through the compressor suction conduit 236 and the compressor suction hose 244 into the compressor 120. The compressor 120 pressurizes the refrigerant and forces the refrigerant through the compressor discharge tube 248 and into the compressor discharge conduit 252. During the pass through the compressor 120, the temperature of the refrigerant increases substantially, such that the refrigerant in the compressor discharge conduit 252 is hotter than the refrigerant coming into the system.

The heated and pressurized refrigerant passes through the opened compressor oil separator input valve 260, and into the compressor oil separator 256. A coalescing filter (not shown) of the compressor oil separator 256 separates the refrigerant from any compressor oil entrained in the refrigerant during the pass through the compressor 120. The refrigerant vapor enters the heat exchanger 216 through the vapor refrigerant return conduit 264. The refrigerant vapor in the heat exchanger 216 transfers heat to the refrigerant and oil in the accumulator chamber 208, which assists in vaporizing the refrigerant entering the accumulator 200. The vapor refrigerant exiting the heat exchanger 216 then enters the discharge conduit 284 and exits the second manifold 116 through the refrigerant discharge hose 288 and is stored in the ISV tank 292.

The refrigerant removed from the air conditioning system includes oil entrained In the refrigerant during normal operation of the air conditioning system. It is desirable to replace the oil removed from the air conditioning system during the recovery process so that the air conditioning system continues to perform optimally. The ACS unit 100 is configured to drain the oil removed from the refrigerant accumulated in the chamber 208 of the accumulator 200 while measuring the change in pressure of the vapor refrigerant over time in the chamber 208. The pressure measurements are then used to determine the volume of oil that was drained, as explained in detail below, so that the proper quantity of oil can be added back into the air conditioning system after the recovery operation is complete.

Figure 4:
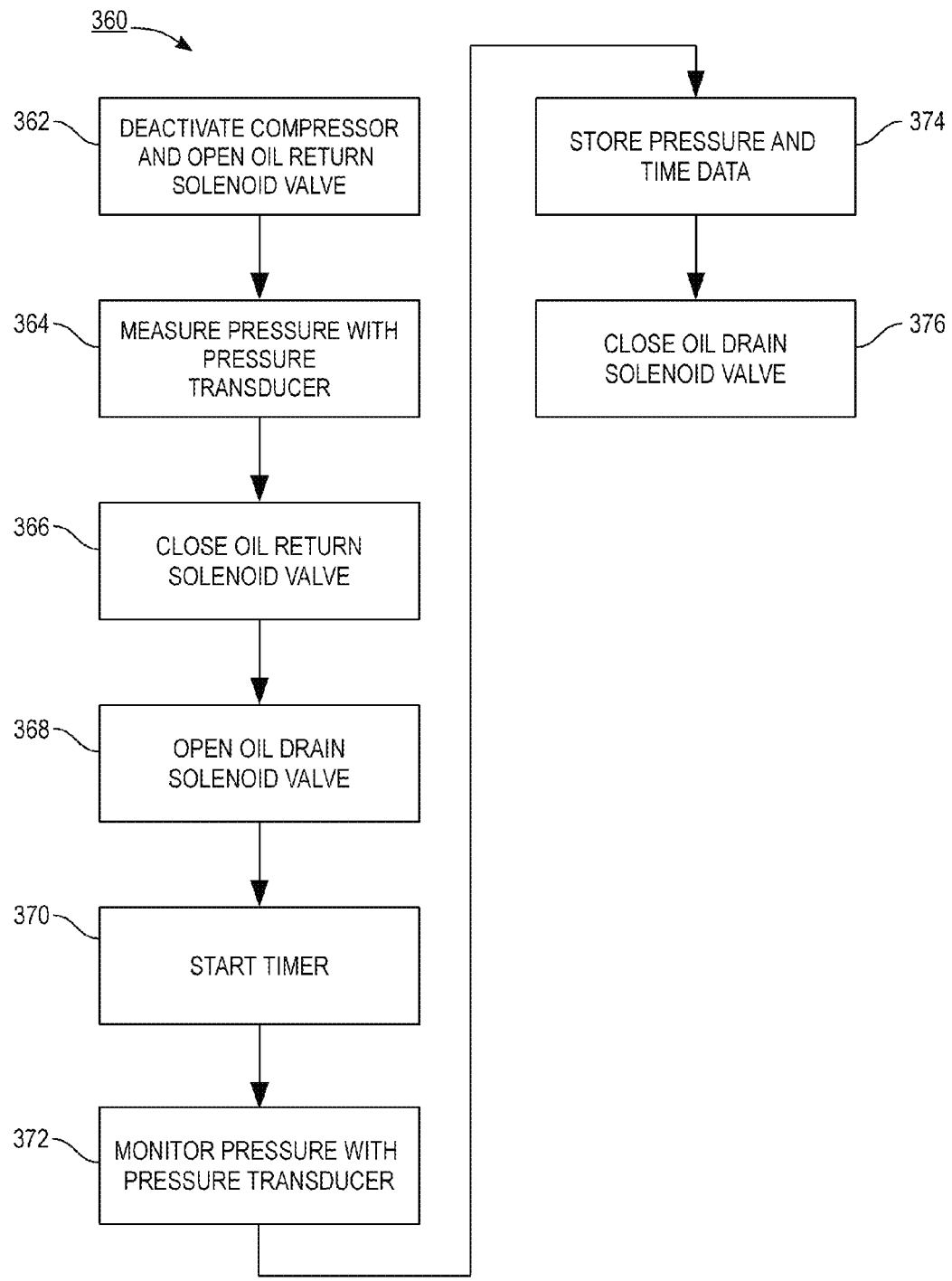
FIG. 4 is a process diagram of a method for operating a controller of the refrigerant service system of FIGS. 1-3 to drain oil accumulated in an accumulator chamber and measure the volume of oil drained.
Figure 5:
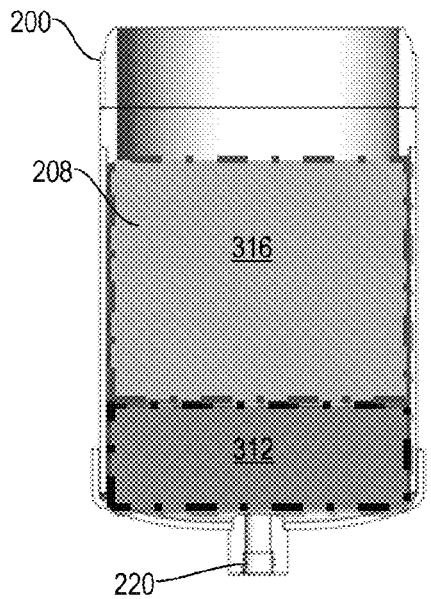
FIG. 5 is a partial cutaway view of an accumulator of the refrigerant service system of FIGS. 1-3 in an initial state containing vapor refrigerant and accumulated oil prior to draining the oil accumulated at the bottom of the accumulator chamber.
Figure 6:
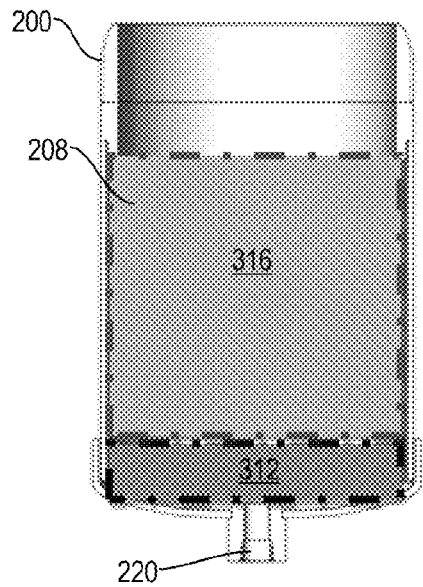
FIG. 6 is a partial cutaway view of the accumulator of FIG. 5 after some of the oil accumulated at the bottom of the accumulator chamber has been drained.
Figure 7:
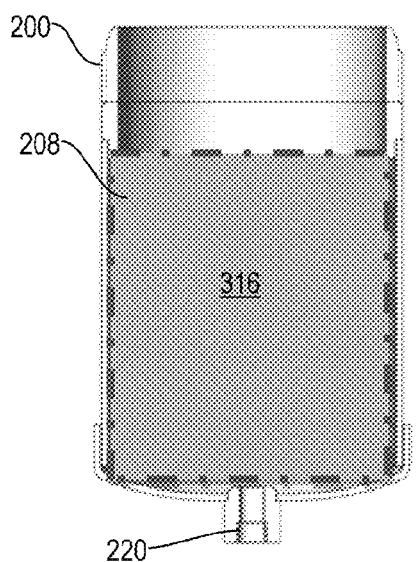
FIG. 7 is a partial cutaway view of the accumulator of FIG. 5 after all of the oil accumulated at the bottom of the accumulator chamber has been drained.

FIG. 4 illustrates one particular method 360 of operating the controller 132 to drain the oil accumulated in the accumulator chamber 208 while collecting pressure measurements used for calculating the volume of oil drained, while FIGS. 5-7 illustrate the accumulator 200 at various points during the method 360. According to the method 360, head pressure is developed in the accumulator chamber 208 to help urge the oil to drain through the oil drain outlet 220. While the oil is draining, the pressure in the accumulator chamber 208 over time is measured and stored.

At block 362, head pressure is developed in the accumulator chamber 208 in order to assist in urging the oil to drain out of the accumulator chamber 208. The controller 132 executes stored programming instructions to deactivate the compressor 120, close the oil separator input solenoid valve 260, and open the compressor oil return solenoid valve 280. With the compressor oil return solenoid valve 280 open, the accumulator chamber 208 is fluidly connected to the compressor oil separator 256 through the compressor suction conduit 236, the compressor suction hose 244, the compressor 120, the compressor oil return hose 276, and the compressor oil return conduit 284. Refrigerant remaining in the compressor oil separator 256 and compressor discharge conduit 252 is at a higher pressure than the accumulator chamber 208 due to being previously passed through the compressor 120. As a result, the refrigerant travels from the compressor oil separator 256 and compressor discharge conduit 252 into the accumulator chamber 208, increasing the pressure in the accumulator chamber 208.

At block 364, the accumulator pressure transducer 204 senses the pressure in the accumulator chamber 208, and sends signals representing the pressure to the controller 132. In the embodiment shown, the pressure transducer 204 continuously senses pressure and sends the pressure readings to the controller 132. In other embodiments, the pressure is sensed at any desired interval. Once the pressure in the accumulator chamber 208 reaches a predetermined threshold, at block 366 the controller 132 operates the compressor oil return solenoid valve 280 to close so that no further vapor refrigerant enters the accumulator chamber 208. In one embodiment, the predetermined threshold is 1.1 bar, though in other embodiments another suitable pressure is used in order to urge the oil to drain from the accumulator chamber 208.

At block 368, the controller 132 operates the oil drain solenoid valve 224 to open to allow the oil 312 (FIGS. 5-7) to drain out of the accumulator chamber 208 and into the oil drain receptacle 232. With the oil drain solenoid valve 224 open, the increased pressure of the vapor refrigerant 316 in the accumulator chamber 208, which was developed at blocks 362-366, now urges the oil to drain out of the accumulator chamber 208 via the oil drain outlet 220. In other embodiments, the system oil is removed from the accumulator chamber 208 by gravity alone, without added additional pressure.

When the oil drain solenoid valve 224 is opened at block 368, the controller 132 also operates a timer (block 370), and continually or periodically monitors the pressure signal generated by the accumulator pressure transducer 204 (block 372). The pressure values from the pressure transducer 204 and time values from the timer corresponding to each pressure value measured are stored in a memory, for example in the memory 308 associated with the controller 132 (block 374).

At block 376, upon detection of a sudden drop in pressure in the accumulator chamber 208, which indicates that the system oil has completely drained from the accumulator chamber 208, the controller 132 operates the oil drain solenoid valve 224 to close. A sudden drop in pressure indicates that the system oil has drained and the vapor refrigerant has begun exiting the oil drain 220, resulting in the detected sudden drop in pressure in the accumulator chamber 208. As shown in FIGS. 5-6, the oil 312 in the accumulator chamber 208 acts as a barrier preventing the vapor refrigerant 316 from escaping through the oil drain 220 at the bottom of the accumulator 208. While the oil is draining, the pressure in the accumulator chamber 208 decreases at a relatively low first rate. After the oil 312 has completely drained, as shown in FIG. 7, the vapor refrigerant 316 may escape through the oil drain 220, resulting in a sudden drop in pressure in the accumulator chamber 208 at a second, measurably higher rate. The controller 132 is configured to detect the sudden drop in pressure, and close the oil drain solenoid valve 224.

Figure 8:
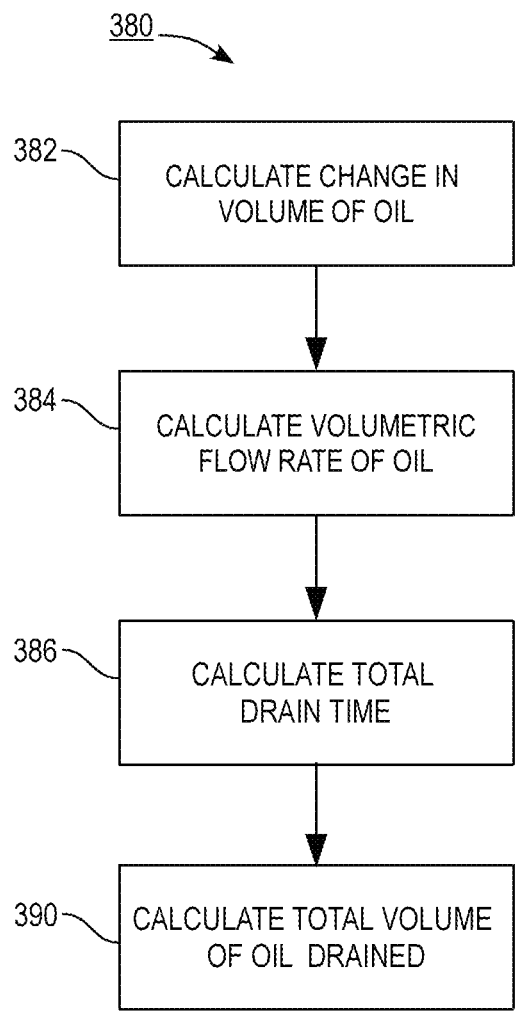
FIG. 8 is a process diagram of a method of determining the volume of oil drained from the accumulator of the refrigerant service system of FIGS. 1-3.

After the oil has been drained and the pressure and time data stored according to the method 360 of FIG. 4, the controller 132 calculates the volume of oil that was drained using the pressure and time data. FIG. 8 depicts one particular method 380 of calculating the volume of oil $V_{1,oil}$ drained.

According to the method 380, the ideal gas law is used to calculate a change in volume of vapor refrigerant in the accumulator chamber during the oil drain based on an assumed initial volume of vapor refrigerant in the chamber, the initial pressure of the refrigerant in the accumulator, and a second pressure in the accumulator measured after a certain time has elapsed. Since the vapor refrigerant 316 occupies the space previously occupied by the oil 312 as oil exits the accumulator chamber 208, the magnitude of the change in volume of the vapor refrigerant 316 is equal to the magnitude of the change in volume of the oil 312 that has been drained from the accumulator chamber 208. The change in volume of the oil 312 and time of the second pressure measurement is used to calculate the volumetric flow rate of the oil 312 leaving the accumulator chamber 208. The total drain time is determined, and the total volume of oil drained is then calculated using the volumetric flow rate of the oil and the total drain time.

Referring to FIG. 8, at block 382, the change in volume of the vapor refrigerant $$V_{2,vap} - V_{1,vap}$$

is calculated using the ideal gas law. The ideal gas law as applied within the accumulator chamber 208 containing the vapor refrigerant states:

$$P_{1,vap}V_{1,vap} = P_{2,vap}V_{2,vap}$$

where $P_{1,vap}$ is the initial pressure of the vapor refrigerant 316 in the accumulator chamber 208; $V_{1,vap}$ is the initial volume of the vapor refrigerant 316 in the accumulator chamber 208; $P_{2,vap}$ is the pressure of the vapor refrigerant 316 in the accumulator chamber 208 after some predetermined period of time $t_2$; and $V_{2,vap}$ is the volume of the vapor refrigerant 316 in the accumulator chamber 208 after the time $t_2$.

At an initial state, the refrigerant vapor in the accumulator chamber 208 has an initial, predetermined pressure $P_{1,vap}$ developed at blocks 362, 364 and 366 of the method 360 of FIG. 4. Since any error between actual and estimated initial volume is negligible or canceled out, the initial volume $V_{1,vap}$ of vapor pressure can be assumed without appreciably affecting the results of the calculation. In one embodiment, the initial volume $V_{1,vap}$ is assumed to be the volume of the accumulator chamber 208 minus a preselected amount equivalent to an assumed amount of oil 312 in the accumulator chamber 208. In one embodiment, the assumed amount of oil 312 is a known average amount of oil separated from the refrigerant recovered from a typical air conditioning system, while in other embodiments the assumed amount of oil is based on another oil amount. In some embodiments, the assumed amount of oil for various applications is stored in the memory 308 for use by the controller 132.

The pressure $P_{2,vap}$ is a pressure value of the refrigerant vapor measured by the pressure transducer 204 at some time $t_2$ after the oil drain solenoid valve 224 has been controlled to open for a predetermined period of time, and is retrieved by the controller 132 from the memory unit 308 associated with the controller 132.

Therefore, $P_{1,vap}$, $V_{1,vap}$, $P_{2,vap}$ are known. Solving for unknown $V_{2,vap}$ yields:

$$V_{2,vap} = \frac{P_{1,vap}V_{1,vap}}{P_{2,vap}},$$

With the volume of vapor refrigerant $V_{2,ref}$ after the predetermined time $t_2$ known, the change in the volume of vapor refrigerant 316, which, as discussed above, is equal to the change in volume of the liquid oil 312 can be calculated as:

$$V_{1,liq} - V_{2,liq} = V_{2,vap} - V_{1,vap} = \frac{P_{1,vap}V_{1,vap}}{P_{2,vap}} - V_{1,vap}$$

With continued reference to FIG. 8, at block 384 the volumetric flow rate of liquid oil $Q_{liq}$ can be calculated from the change in volume of oil over the time measured:

$$Q_{liq} = \frac{V}{T} = \frac{V_{1,liq} - V_{2,liq}}{t_2} = \frac{V_{2,vap} - V_{1,vap}}{t_2} = \frac{\frac{P_{1,vap}V_{1,vap}}{P_{2,vap}} - V_{1,vap}}{t_2}$$

At block 386, the total time $t_T$ required to drain the oil is determined. The total time taken to drain the oil $t_T$ is the time from when the timer is first started at block 370 of the method 360 of FIG. 4, when the solenoid valve 224 is controlled to the open position to begin the oil drain, to a moment just before the sudden drop of pressure is detected in the accumulator chamber 208 at block 376 indicating all liquid oil has drained.

At block 390, the volumetric flow rate of liquid oil $Q_{liq}$ leaving the accumulator chamber 208 is multiplied by the total drain time $t_T$ in order to determine the total volume of liquid oil drained $V_{1,liq}$:

$$V_{1,liq} = Q_{liq}t_T$$

It should be appreciated that the pressure $P_{2,vap}$ measured at time $t_2$ may be taken at any desired time while the oil is draining. In one embodiment, the pressure after 5 seconds of drain time has passed is used. In another embodiment, the pressure data at a time equal to half the total drain time is used, or a quarter, or an eighth, or three quarters. In yet another embodiment, the pressure reading immediately before the pressure increase is detected, right before the oil is completely drained, is used. The volumetric flow rate may also be calculated at any time during the drain. In some embodiments, more than one measurement for volumetric flow rate is obtained for corresponding pressure and time measurements recorded, and averaged to obtain a final volumetric flow rate.

One particular example is illustrated in FIGS. 5-7. FIG. 5 shows the accumulator 200 in an initial state with oil 312 accumulated on the bottom of the chamber 208 and pressurized vapor refrigerant 316 at a predetermined pressure (blocks 362, 364 and 366 from method 360 shown in FIG. 4). In the embodiment shown, the vapor refrigerant 316 has an initial pressure $P_{1,vap}=1.1$ bar. In the particular embodiment shown, the initial volume of vapor refrigerant $V_{1,vap}$ is assumed to be 900 mL, which is, for example, the volume of the accumulator chamber 208 minus an average volume of oil drained from a particular air conditioning system being serviced. FIG. 6 depicts the accumulator 200 after the solenoid valve 224 (FIG. 2) has been open for 5 seconds. The pressure measured by the transducer 204 (FIG. 2) is 1.05 bar. In the embodiment shown, the controller 132 (FIG. 3) is configured to calculate the volume of vapor refrigerant $V_{2,vap}$ and the flow rate of liquid oil $Q_{liq}$ after 5 seconds, yielding $V_{2,vap}=942.85$ mL and $Q_{liq}=8.57$ mL/s.

FIG. 7 depicts the accumulator 200 after all of the oil 312 (FIGS. 7-8) has been drained. The controller 132 detects the sudden decrease in pressure indicating that vapor refrigerant 316 has escaped the accumulator chamber 208 through the oil drain outlet 220. In the embodiment shown, the controller 132 determines that immediately prior to the sudden decrease in pressure the timer reading was 30 seconds, indicating that the total time $t_T$ taken to drain the oil was 30 seconds. The controller then calculates the volume of liquid oil drained as $$V_{1,liq} = Q_{liq}t_T = 8.57*30 = 255 \text{ ml of oil.}$$

The reader should appreciate that in various embodiments, some steps of the above method 360 of FIG. 4, and the method 380 of FIG. 8 are omitted or are performed in a different sequence than illustrated. Additionally, in some embodiments, certain steps of the methods are performed concurrently.

After the volume of oil drained has been determined by the controller according to the method 380 of FIG. 8, the controller may output the volume of oil to the input/output unit 30 so that a technician knows how much new oil that must be added to the air conditioning system by the ACS system 100. In one embodiment, the ACS system automatically injects a volume of new oil equivalent to the amount determined by the controller to have been drained. One such system is disclosed in international publication WO 2015/164725, the contents of which are hereby incorporated by reference in their entirety.

Figure 9:
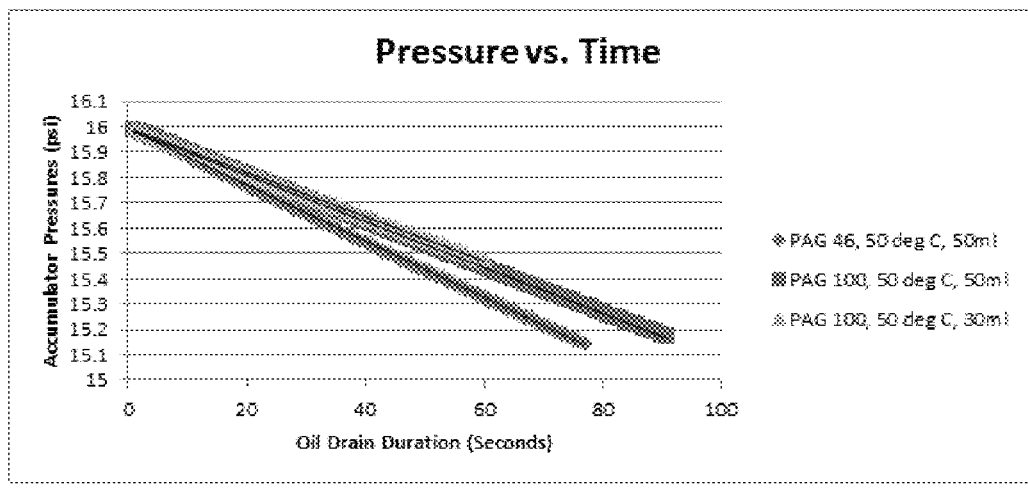
FIG. 9 illustrates a graph of accumulator pressure against time for several oils during a drain process.

FIG. 9 illustrates a graph of the accumulator pressure against time for several oils during a drain process. The graph illustrates that the pressure of the vapor in the accumulator chamber decreases linearly over time as the valve is open and the oil drains from the chamber.

The method of determining the amount of oil to be injected back into the air conditioning system based on the volume of oil drained offers many advantages over previous methods. For example, the method eliminates the human error involved with previous methods requiring an ACS unit user to manually determine an amount of oil that must be added by visually inspecting the oil level of old oil drained into an oil drain bottle with reference to graduated markings on the bottle. Furthermore, implementing the method into an ACS unit eliminates the need for a load cell into the ACS unit to measure the weight of the oil as it gathers in the oil drain bottle. Load cells add substantial cost to production of the unit, and are much more expensive than the pressure transducer used in embodiments of the disclosure.

Furthermore, as mentioned, previous systems that rely on the weight of the oil removed may ensure the same weight of oil that was removed is injected, but do not compensate for differences in temperature that result in a different volume of oil to be injected back into the system. The method of the disclosure determines the volume directly, rather than the weight, thereby eliminating the need to convert the oil weight to volume. As a result, the system and method of the present disclosure improves accuracy of the determination of oil removed from an air conditioning system attached to the ACS unit, thereby enabling the air conditioning system to be returned to the proper oil quantity, improving operation of the air conditioning system.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:
1. An air conditioning service system comprising:
an accumulator defining an accumulator chamber;
a pressure transducer operably connected to the accumulator chamber;

a drain valve operably connected to the accumulator chamber; and a controller operably connected to the pressure transducer and the drain valve, the controller including a processor configured to execute program instructions stored in a memory to determine a volume of liquid drained from the accumulator by:

determining a volumetric flow rate of liquid through the drain valve by controlling the drain valve with the controller to an open position for a predetermined period of time, detecting an increased rate of pressure reduction while the drain valve is controlled to the open position, and determining an amount of liquid drained through the drain valve based upon the determined volumetric flow rate and a total time elapsed between controlling the drain valve to the open position and the detected increased rate of pressure reduction.

2. The system of claim 1, wherein the controller is configured to execute the program instructions to determine the volumetric flow rate by:

obtaining a first signal from the pressure transducer associated with a first pressure within the accumulator chamber prior to controlling the drain valve to the open position; and obtaining a second signal from the pressure transducer associated with a second pressure within the accumulator chamber after the predetermined period of time has elapsed.

3. The system of claim 2, wherein the controller is configured to execute the program instructions to determine the volumetric flow rate based upon the following equation:

$$V_{2,vap} = \frac{P_{1,vap} V_{1,vap}}{P_{2,vap}}$$

wherein $P_{1,vap}$ is the first pressure, $V_{1,vap}$ is a first volume of vapor in the accumulator chamber before the drain valve is controlled to an open position, $P_{2,vap}$ is the second pressure, and $V_{2,vap}$ is a second volume of the vapor in the accumulator chamber associated with the second pressure.

4. The system of claim 3, wherein the controller is configured to execute the program instructions to determine the volumetric flow rate based upon the following equation:

$$Q_{liq} = \frac{V_{2,vap} - V_{1,vap}}{t_2}$$

wherein:

$t_2$ is the predetermined period of time, and $Q_{liq}$ is the volumetric flow rate.

5. The system of claim 4, wherein the controller is configured to execute the program instructions to determine the amount of liquid drained through the drain valve based upon the following equation:

$$V_{1,liq} = Q_{liq} t_T$$

wherein:

$v_{1,liq}$ is the amount of liquid drained through the drain valve, and $t_T$ is the total time elapsed between controlling the drain valve to the open position and the detected increased rate of pressure reduction.

6. The system of claim 1, wherein the controller is configured to execute the program instructions to control the drain valve to a closed position after the detected increased rate of pressure reduction.

7. The system of claim 1, wherein the predetermined period of time is less than or equal to the total time elapsed between controlling the drain valve to the open position and the detected increased rate of pressure reduction.

8. The system of claim 1, further comprising:

a first valve operably connected to the accumulator chamber and a source of pressure, wherein the controller is operably connected to the first valve and is configured to execute the program instructions to control, before determining the volumetric flow rate, the first valve to a first valve open position for a second predetermined time and control the first valve to a first valve closed position after the second predetermined time has elapsed.

9. The system of claim 8, wherein the source of pressure includes an oil separator filled with compressed refrigerant vapor.

10. The system of claim 1, wherein the vapor in the accumulator chamber includes a refrigerant and the liquid drained from the accumulator includes an oil.

11. A method of determining a volume of liquid drained from an accumulator chamber defined in an accumulator, comprising:

determining, with a controller, a volumetric flow rate of liquid through a drain valve operably connected to the accumulator chamber by controlling the drain valve to an open position for a predetermined period of time;

detecting, with the controller, an increased rate of pressure reduction while the drain valve is controlled to the open position using a pressure transducer operably connected to the accumulator chamber; and determining, with the controller, an amount of liquid drained through the drain valve based upon the determined volumetric flow rate and a total time elapsed between controlling the drain valve to the open position and the detected increased rate of pressure reduction.

12. The method of claim 11, wherein the determining of the volumetric flow rate further comprises:

obtaining a first signal from the pressure transducer associated with a first pressure within the accumulator chamber prior to controlling the drain valve to the open position; and obtaining a second signal from the pressure transducer associated with a second pressure within the accumulator chamber after the predetermined period of time has elapsed.

13. The method of claim 12, wherein the determining of the volumetric flow rate is based upon the following equation:

$$V_{2,vap} = \frac{P_{1,vap} V_{1,vap}}{P_{2,vap}}$$

wherein:

$P_{1,vap}$ is the first pressure, $V_{1,vap}$ is a first volume of vapor in the accumulator chamber before the drain valve is controlled to an open position, $P_{2,vap}$ is the second pressure, and $V_{2,vap}$ is a second volume of the vapor in the accumulator chamber associated with the second pressure.

14. The method of claim 13, wherein the determining of the volumetric flow rate is based upon the following equation:

$$Q_{liq} = \frac{V_{2,vap} - V_{1,vap}}{t_2}$$

wherein:

$t_2$ is the predetermined period of time, and $Q_{liq}$ is the volumetric flow rate.

15. The method of claim 14, wherein the determining of the amount of liquid drained through the drain valve is based upon the following equation:

$$v_{1,liq} = Q_{liq} t_T$$

wherein:

$v_{1,liq}$ is the amount of liquid drained through the drain valve, and $t_T$ is the total time elapsed between controlling the drain valve to the open position and the detected increased rate of pressure reduction.

16. The method of claim 11, further comprising:

controlling the drain valve, with the controller, to a closed position after the detected increased rate of pressure reduction.

17. The method of claim 11, wherein the predetermined period of time is less than or equal to the total time elapsed between controlling the drain valve to the open position and the detected increased rate of pressure reduction.

18. The method of claim 11, further comprising:

before the determining of the volumetric flow rate, controlling a first valve operably connected to the accumulator chamber and a source of pressure to a first valve open position for a second predetermined time; and controlling the first valve to a first valve closed position after the second predetermined time has elapsed.

19. The method of claim 18, wherein the source of pressure includes an oil separator having compressed vapor refrigerant.

20. The method of claim 11, wherein the vapor in the accumulator chamber includes refrigerant and the liquid drained from the accumulator includes oil.

* * * * *